United States Patent [19]

O'Malley

[11] 4,039,707

[45] Aug. 2, 1977

[54] ARTICLE COMPRISING A SILICONE PRESSURE-SENSITIVE ADHESIVE AND A RELEASABLE ANTI-STICK LAYER AND PROCESS OF USING SAME

[75] Inventor: William J. O'Malley, Ballston Lake, N.Y.

[73] Assignee: General Electric Company, Waterford, N.Y.

[21] Appl. No.: 579,898

[22] Filed: May 22, 1975

Related U.S. Application Data

[63] Continuation-in-part of Ser. No. 364,246, May 29, 1973, abandoned.

[51] Int. Cl.$^2$ .......................... B32B 13/04; C09J 7/02
[52] U.S. Cl. ...................................... 428/40; 260/825; 427/155; 428/352; 428/355; 428/447
[58] Field of Search ................. 260/825; 428/40, 42, 428/352, 355, 447; 427/155, 207

[56] References Cited

U.S. PATENT DOCUMENTS

| | | | |
|---|---|---|---|
| 2,814,601 | 11/1957 | Currie et al. | 260/29.1 |
| 2,857,356 | 10/1958 | Goodwin | 260/42 |
| 2,985,554 | 5/1961 | Dickard | 428/40 |
| 3,046,160 | 7/1962 | Dengler | 428/447 |
| 3,087,832 | 4/1963 | Fogle | 428/447 |
| 3,146,799 | 9/1964 | Fekete | 428/352 X |
| 3,528,940 | 9/1970 | Modic | 260/37 |
| 3,533,899 | 10/1970 | Kapral | 428/40 |
| 3,628,996 | 12/1971 | Weber | 260/825 X |
| 3,814,731 | 6/1974 | Nitzsche et al. | 260/46.5 UA |
| 3,839,075 | 10/1974 | Moriyama et al. | 428/355 X |

*Primary Examiner*—P.E. Willis, Jr.
*Attorney, Agent, or Firm*—E. Philip Koltos; Edward A. Hedman; Rocco S. Barrese

[57] ABSTRACT

An article comprising a backing, a silicone pressure-sensitive adhesive, having an alkylarylpolysiloxane gum component on the backing, and a releasable anti-stick layer of cured reactive terminal group containing dimethylpolysiloxane fluid-coated sheet on the silicone pressure-sensitive adhesive, and the process of using the article are provided.

27 Claims, No Drawings

ARTICLE COMPRISING A SILICONE PRESSURE-SENSITIVE ADHESIVE AND A RELEASABLE ANTI-STICK LAYER AND PROCESS OF USING SAME

RELATED APPLICATION

This application is a continuation-in-part of copending U.S. application Ser. No. 364,246 filed on May 29, 1973, now abandoned.

BACKGROUND OF THE INVENTION

This invention relates to articles comprising a base coated with a pressure-sensitive silicone adhesive and a releasable anti-stick layer on the adhesive, and to a method of employing the article.

organopolysiloxane compositions have been widely used as pressure-sensitive adhesives. When various silicone resins and gums are mixed, interreacted or intercondensed and applied to suitable substrates or backings there are provided pressure-sensitive adhesive articles. The adhesives can be formulated to serve over broad temperature ranges, such as from about $-50°$ C to about $250°$ C, and will retain their tack and cohesion over these ranges, while exhibiting a low level of moisture sensitivity. In addition, organopolysiloxane pressure-sensitive adhesives have excellent electrical properties. Finally, organopolysiloxane pressure-sensitive adhesives exhibit outstanding adhesive characteristics on a wide variety of substrates. They are suitable for many substrates for which non-silicone pressure-sensitive adhesives have shown little or no affinity, such as for "Teflon" substrates.

After preparation and before use, articles having a pressure-sensitive adhesive layer require that the surface of the layer be protected both from contamination and from adhering or sticking to undesired surfaces. In addition, if such an article is to be used in the form of a tape and wound in rolls, the backing of one layer will necessarily come into contact with the pressure-sensitive adhesive coating on the layer thereabove. This contact will often cause the upper layer to adhere to the next lower layer, making it extremely difficult to unwind the tape because of the aggressively tacky characteristic of the organopolysiloxane pressure-sensitive adhesive.

For these reaons, it is necessary to employ a protective, releasable film or coating adjacent the pressure-sensitive adhesive.

One of the best known of such release coatings is a cured composition based on a silanol-stopped, dimethylpolysiloxane fluid, e.g., General Electric Co. SS-4191. This is coated onto a release paper sheet and then applied to the pressure-sensitive adhesive. Other good release coatings include cured compositions based on dimethylvinyl-stopped dimethyl polysiloxane fluid, e.g., General Electic Co. SS-4280, and dimethylhydrogen-stopped dimethylpolysiloxane fluids.

However, with conventional adhesives, e.g., one based on a silanol-stopped dimethyl gum, the peel strength between the adhesive and the release sheet is sufficiently high that often the paper sheet tends to tear frequently when stripped. The peel strength immediately after laminating is high, and of the order of 25 oz./in.

It has now been discovered that if a particular type of adhesive is selected, namely, one in which the gum component differs from the conventional adhesive mentioned above, in that it uses at least one copolymer gum containing diphenylsiloxane units and especially preferably, methyl vinyl siloxane units and vinyl chainstoppers, as well, a vast decrease in peel strength between the reactive end group containing methylpolysiloxane fluid-coated release paper and the adhesive coated backing is obtained. This is of the order of 4 oz./in. and paper tearing is eliminated. The easy release capabilities are retained even after accelerated oven aging and the subsequent adhesion of such tapes, e.g., after application to stainless steel test panels, is excellent over prolonged periods of oven aging.

DESCRIPTION OF THE INVENTION

According to the present invention the are provided articles comprising a unitary coherent backing, an organopolysiloxane pressure-sensitive adhesive layer on at least one side of said backing, and a relesable anti-stick layer comprising a cured reactive terminal group containing dimethylpolysiloxane fluid-coated sheet on the organopolysiloxane pressure-sensitive adhesive, said adhesive comprising the intercondensation product of a mixture containing an organopolysiloxane resin and at least one alkylarylpolysiloxane gum.

According to the present invention there is also provided a process for adherently applying an article coated with an organopolysiloxane pressure-sensitive adhesive to a substrate, said process comprising:

a. providing an article comprising a backing, an organopolysiloxane pressure-sensitive adhesive layer on at least one side of said backing, and a releasable anti-stick layer comprising a cured reactive terminal group containing dimethylpolysiloxane fluid-coated sheet on the organopolysiloxane pressure-sensitive adhesive, said adhesive comprising the intercondensation product of a mixture containing an organopolysiloxane resin and at least one alkylarylpolysiloxane gum;

b. separating said releasable anti-stick layer from the organopolysiloxane pressure-sensitive adhesive; and c. applying the article containing the organopolysiloxne pressure-sensitive adhesive to a substrate.

The releasable anti-stick layer can comprise a cured reactive terminal group containing dimethylpolysiloxane fluid-coated sheet, in which the sheet is a unitary coherent backing of a natural substance, e.g., cloth or paper, or a polymer, e.g., polyethylene, polytetrafluoroethylene, polyethylene terephthalate (Mylar), or a metal foil and the like. The sheet will be coated on the side to be presented to the adhesive with a linear fluid dimethylpolysiloxane containing terminal reactive or curable groups, such as hydroxy groups or dimethylvinyl groups or dimethyl hydrogen groups and, preferably, one having a viscosity of 100 to 10,000,000 centipoiste when measured at $25°$ C. The coated sheet is then cured by heat in conjunction with the use of conventional catalysts and cross-linking agents such as dibutyl-tin dilaurate, platinum materials, methyl hydrogen polysiloxanes and the like. Hence, suitable reactive terminal group containing dimethylpolysiloxane fluid materials included within the scope of this invention are of the formulae:

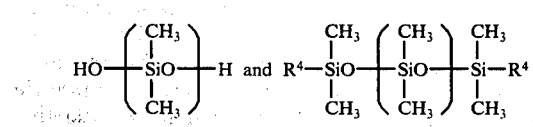

wherein $R^4$ is selected from the group consisting of hydrogen and vinyl and wherein p is a whole number that varies from 300 to 5,260, and wherein p' is a whole number that varies from 148 to 890. The base linear silanol terminated diorganopolysiloxane depicted above generally has a viscosity of 1,000 to 10,000,000 and preferably 12,000 to 90,000 where the value of p varies from 770 to 1,350. In the most preferred embodiment, the base linear silanol terminated diorganopolysiloxane has a viscosity of 15,000 to 35,000 centipoise where the value of p varies from 825 to 1,100. In the case of the base linear dimethylvinyl-stopped dimethylpolysiloxane and the dimethylhydrogen-stopped dimethyl polysiloxane depicted above, the preferred viscosity is in the range of from about 200 to 500 cps. at 25° C and p' is in the range of from about 195 to 255.

Other anti-stick coatings contemplated herein include those disclosed, for example, in U.S. Pat. No. 3,814,731 to Nitzsche et al, incorporated herein by reference. These Nitzsche et al coatings are, in general, based on compositions comprising (1) diorganopolysiloxanes possessing reactive end groups in the terminal units, (2) organopolysiloxanes possessing at least 3 Si-bonded hydrogen atoms per molecule, and (3) curing catalysts.

Preparation of the reactive terminal group containing dimethylpolysiloxane fluids may be carried out by any of the procedures well known to those skilled in the art. One such procedure for preparing silanol-stopped fluids involves hydrolysis of methyl substituted dichlorosilanes to produce a crude hydroylzate containing a mixture of linear and cyclic polysiloxanes. The crude hydrolyzate is then treated with a suitable catalyst such as KOH so that it can be depolymerized to form a mixture of low boiling, low molecular weight cyclic polymers and undesirable materials such as the monofunctional trifunctional chlorosilane starting material. The resulting composition is fractionally distilled and there is obtained a pure product containing the low boiling, low molecular weight cyclic polymers free of any significant amount of monofunctional and trifunctional groups.

High molecular weight dimethylpolysiloxanes having a viscosity of $5 \times 10^5$ centipoise at 25° C. and above can be treated with water to arrive at low molecular weight diorganopolysiloxanes having a viscosity of 1,000 to 90,000 centipoise at 25° C. This may be accomplished by blowing steam across the surface of the high molecular weight product or through the polymer for a sufficient length of time to obtain the low molecular weight component having the desired silanol content. Thus, if it is desirable to obtain the low molecular weight diorganopolysiloxane from a portion of the high molecular weight diorganopolysiloxanes by the above water treatment which is well known to those skilled in the art so as to reduce the number of diorganosiloxy units from above 5,260 to a value in the neighborhood of 300. The use of steam in this fashion will cause a decrease in the viscosity of the polymer while at the same time the formed linear polysiloxane will have terminal silicon-bonded hydroxy groups.

Alternatively, the low molecular weight diorganopolysiloxanes can be produced from the high molecular weight diorganopolysiloxane by adding water to them and heating the resulting composition at elevated temperatures of 150° C. to 170° C. so as to break up the long chain polymers into smaller chains. The amount of water used will vary depending upon such factors as the molecular weight of the polymer being treated, the time and the temperature at which the mixture of high molecular weight diorganopolysiloxanes are heated and the desired viscosity. These conditions may readily be determined. For example, a high molecular weight diorganopolysiloxane having a viscosity of 2,000,000 centipoise at 25° C. may be heaed to 150° C. with 0.5 percent by weight of water for two hours to arrive at a low molecular weight diorganopolysiloxane having a viscosity of 2,000 centipoise. Preferably, the low molecular weight organopolysiloxane is produced so that it has a viscosity of 12,000 to 90,000 centipoise at 25° C.

With particular concern for the dimethylvinylstopped dimethylpolysiloxane and the dimethylhydrogen-stopped dimethylpolysiloxane anti-stick coatings contemplated herein, these can be made, for example, by equilibrating octamethylcyclotetrasiloxane, in the presence of either dimethylvinyl polysiloxane chain stopper or dimethylhydrogenpolysiloxane chain stopper in the present of KOH and heat for a sufficient time to provide the desired viscosity of the final product.

The pressure-sensitive adhesive employed in the present invention will be an organopolysiloxane composition possessing pressure-sensitive adhesive properties. It is of course understood that the organopolysiloxane pressuresensitive adhesive employed in the present invention is predominantly obtained from organopolysiloxane and does not merely contain the organopolysiloxane in minor quantities. As is well known, organopolysiloxane pressure-sensitive adhesive compositions are usually obtained from the interreaction between certain organopolysiloxane resins and substantially linear organopolysiloxane gums.

The organopolysiloxane gums which are to be employed in the silicone pressure-sensitive adhesives can comprise a single species or a plurality of species.

The gums will have a viscosity of from about 200,000 to 15,000,000 centipoises and contain an average of from about 1.85 to 2.01 silicon-bonded alkyl and aryl radicals per silicon atom, with the alkyl and aryl radicals being selected from the group consisting of alkyl radicals having from 1 to 8 carbon atoms; cycloalkyl radicals having from 5 to 7 carbon atoms in the ring; lower alkenyl radicals having from 2 to 8 carbon atoms, mononuclear aryl radicals, mononuclear aryl lower alkyl radicals having from 1 to 6 carbon atoms in the alkyl group and halogenated derivatives of the above radicals, the organic radicals being attached to silicon through silicon-carbon linkages and with there being present in the gum from about 2% to about 75% arylsilicon linkages of the total silicon organic linkages and about 0.001 to 0.25% by weight silicon-bonded hydroxyl groups or alkoxy groups.

Generally speaking these gums comprises primarily diorganosiloxane units, but can also contain minor amounts of monoorganosiloxane units and triorganosiloxane units. One particularly useful type of organopolysiloxane gum is the linear polymer having the formula:

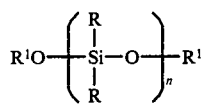

where R is a member selected from the class consisting of monovalent hydrocarbon radicals, halogenated monovalent hydrocarbon radicals and cyanoalkyl radicals and n has a value of at least 500 e.g., from about 5,000 to 500,000 or more, and $R^1$ is selected from the group of hydrogen, alkyl and vinyl. The organopolysiloxane within the scope of the above formula can comprise a variety of molecules of different molecular weights and of different R and $R^1$ substituents so long as the average formula of the reaction mixture falls within the scope of the formula.

In addition to the linear silanol or alkoxy chain-stopped diorganopolysiloxanes of the above formula, the gum can also contain some molecules containing linear diorganosiloxane chains which are terminated at one end with triorganosiloxane units having the formula:

$$(R)_3SiO_{0.5}$$

with the other end of the chains being terminated by alkoxy or silanol groups, where R is as previously defined. The polymer chains can also contain some molecules containing monoorganosiloxane units having the formula:

$$RSiO_{1.5}$$

where R is as previously defined. In any case, the organopolysiloxane gums generally have a viscosity in the range of from about 200,000 to 15,000,000 centipoise as previously described and preferably, in the range of from about 500,000 to 12,000,000 centipoises, with the amount of silicon-bonded hydroxyl and/or alkoxy groups being equal to at least about from 0.001 to 0.25% by weight and preferably, from about 0.005 to 0.1% by weight. These various organopolysiloxane gums are well known in the art and their preparation need not be described in the present application.

Illustrative of the groups for R of the organopolysiloxane gums are, for example, alkyl radicals, e.g., methyl, ethyl, propyl, butyl, octyl, etc., radicals; aryl radicals, e.g., phenyl naphthyl, tolyl, etc., radicals; aralkyl radicals, e.g., benzyl, phenylethyl, etc., radicals; alkenyl radicals, e.g., vinyl, allyl, etc., radicals; cycloaliphatic hydrocarbon radicals, e.g., cyclohexyl, cycloheptyl, cyclohexenyl, etc., radicals; various halogenerated monovalent hydrocarbon radicals, such as, for example, chloromethyl, alpha-chloroethyl, beta-chloroethyl, chlorophenyl dibromophenyl, trifluoromethylphenyl, trifluoromethylpropyl etc., radicals; as well as cyanoalkyl radicals, such as, for example, cyanomethyl, betacyanoethyl, beta-cyanopropyl, gamma-cyanopropyl, omegacyanobutyl, etc., radicals.

The preferred organo radicals represented by R in the organopolysiloxane gums employed in the practice of the present invention are phenyl, methyl, vinyl, and mixtures thereof.

$R^1$ of the organopolysiloxane gums of the above formula is hydrogen or alkyl group such as methyl, ethyl propyl, t-butyl, octyl, hexyl, and stearly or an alkenyl group such as vinyl. Preferably, $R^1$ is hydrogen.

It is essential to the invention that the organopolysiloxane gum constituent contain aryl groups, e.g., phenyl, for optimum pressure-sensitive adhesive properties. When, for example, a mixture of phenyl and methyl groups is employed, the number of silicon-bonded phenyl groups should be maintained within such a range that for each 2 to 75 phenyl groups attached directly to silicon by a carbon-silicon linkage, there are present from 98 to 25 silicon-bonded methyl groups. A preferred range is, for instance, from about 5 to about 15 phenyl groups per 95 to 85 methyl groups.

The term "organopolysiloxane resin" as employed in the present invention is intended to mean polymers containing two or more siloxane units, and having the average unit formula:

$$(OH)_q(OR^2)_rR^2{}_sSiO_{\frac{4-q-r-s}{2}}$$

where $R^2$ is selected from the class consisting of alkyl radicals having 1 to 8 carbon atoms; cycloalkyl radicals having 5 to 7 carbon atoms in the ring; lower alkenyl radicals having 2 to 8 carbon atoms; mononuclear aryl radicals; monocuclear aryl lower alkyl radicals having 1 to 6 carbon atoms in the alkyl group; and halogenated derivatives of the above radicals; $OR^2$ is lower alkoxy radical containing from 1 to 8 carbon atoms per radical; s has a value of 1.0 to 1.7 and preferably, has a value of 1.05 to 1.45; q has a value of 0 to 1.0 and preferably, a value of 0.2 to 0.55; r has a value of 0 to 1.0 and preferably, has a value of 0.2 to 0.55 and the sum of $q + r$ has a value of 0.01 to 1.0 and preferably, has a value of 0.2 to 0.55.

Examples of siloxane units that can be present in the organopolysiloxane resins are:
$C_6H_5SiO_{3/2}$, $(C_6H_5)_2SiO$, $CH_3SiO_{3/2}$, $(CH_3)_2SiO$,
$(CH_3)C_6H_5SiO$, $C_2H_5SiO_{3/2}$, $(C_2H_5)_2SiO$,
$(C_2H_5)C_6H_5SiO$, $C_3H_7SiO_{3/2}$, $(C_3H_7)_2SiO$,
$(C_3H_7)C_6H_5SiO$, $CH_2=CHSiO_{3/2}$,
$(CH_2=CH)Ch_3SiO$,
$CH_2=CHCH_2SiO_{3/2}$, $(CF_3CH_2CH_2)CH_3SiO$,
$ClCH_2CH_2SiO_{3/2}$,
$C_6H_{11}SiO_{3/2}$, $Cl_2C_6H_3SiO_{3/2}$, $CF_3C_6H_4SiO_{3/2}$,
$(C_6H_5)CF_3CH_2CH_2SiO$, $CH_3C_6H_4SiO_{3/2}$, and $C_6H_5CH_2SIO_{3.2}$.

More specifically, $R^2$ is selected from the class consisting of lower alkyl radicals, e.g., methyl, ethyl, propyl, butyl, and octyl radicals; cycloalkyl radicals having 5 to 7 carbon atoms in the ring, e.g., cyclopentyl, cyclohexyl, and cycloheptyl radicals; lower alkenyl radicals, e.g., vinyl and allyl radicals; mononuclear aryl, e.g., phenyl, tolyl and xylyl; mononuclear aryl lower alkyl radicals, e.g., benzyl and phenylethyl radicals; and halogenated derivatives of the above radicals, e.g., chloromethyl, beta-chloroethyl, chlorophenyl, dibromophenyl and trifluoromethylethyl radicals. Preferably, $R^2$ is selected from the class consisting of methyl, ethyl, and phenyl.

The lower alkoxy radical, $OR^2$, is selected from the class consisting of lower alkoxy radicals having 1 to 8 carbon atoms, e.g., methoxy, ethoxy, propoxy, and isopropoxy radicals and is preferably selected from the class consisting of the above specifically named radicals.

The ratio of the organic substituents, $R^2$, to the silicon atoms in the above-described siloxane resin is in the range of 1.0:1 to 1.7:1 and preferably in the range of 1.05:1 to 1.45:1.

In addition, the resin should contain at least 0.25% by weight of silicon-bonded OH and/or (OR) groups. The resin can obtain a much higher percentage of OH groups and can contain at least 5 weight percent of OH groups. The (OR) groups are lower alkoxy groups having up to 8 carbon atoms, such as methoxy, ethoxy, and isopropoxy groups.

It has been found advantageous to employ from about 0.5 to about 6 parts by weight of the organopolysiloxane gum per part by weight of the organopolysiloxane resin. Preferably, from about 1 to about 3 parts by weight of the organopolysiloxane gum per part by weight of the organopolysiloxane resin are used in the present invention. It has been found, however, that improved properties such as decreased tackiness of the adhesive and increased peel strength towards the substrate are realized if from about 1.5 parts by weight of the organopolysiloxane resin per part by weight of the organopolysiloxane gum are used.

The preparation of some particularly advantageous organopolysiloxane pressure-sensitive adhesives is set forth in U.S. Pat. No. 2,857,356 to Goodwin Jr., disclosure of which is incorporated herein by reference. The organopolysiloxane resins employed in U.S. Pat. No. 2,857,356 are cohydrolysis products of a trialkyl hydrolyzable silane of the general formula $R_3{}^3$ SiX; and an alkyl silicate of the general formula $(R^3O)_4Si$. The mole ratio of silicate to trialkyl hydrolyzable silane is from 1:1 to 2:1 and preferably from about 1.2:1 to 1.8:1. X in the above formula of the hydrolyzable silane is a hydrolyzable group such as a halogen (e.g., chlorine, bromine, fluorine, etc.), alkoxy radical (e.g., methoxy, ethoxy, etc.), acyloxy, etc. $R^3$ in the above formulas is a lower alkyl radical such as having from 1 to 4 carbon atoms. Exemplary of such lower alkyl radicals are methyl, ethyl, propyl, isopropyl, butyl, and isobutyl.

The organopolysiloxane pressure-sensitive adhesive is usually employed so as to provide film thicknesses of from about 0.7 mils to about 4 mils and preferably from about 1 to about 3 mils. Of course, other film thicknesses can be used according to the particular intended application of the pressure-sensitive adhesive article.

The unitary coherent backing or base upon which the organopolysiloxane pressure-sensitive adhesive is applied can be selected from a wide variety of backings according to the intended application of the article. The pressure-sensitive article can be a pressure-sensitive tape in the form of a convolutely wound roll; a sheet; or any desired configuration.

It is understood that the backing can be any suitable material for supporting the pressure-sensitive adhesive. Included among these suitable backing materials are glass cloth, silicone coated glass cloth, synthetic polymeric films such as polyimides, polyamides, silicones, polytetrafluoroethylene and polychlorotrifluoroethylene, polyethylene, polypropylene, copolymers of acrylonitrile, butadiene, and styrene, polyesters such as polyethyleneterephthalate, and acetal polymers; metallic substrates such as aluminum foil and copper foil; and polymer coated papers such as polyethylene coated papers.

The articles of the present invention can be prepared by admixing the organopolysiloxane resin and organopolysiloxane gum together and then cocondensing or interreacting them at elevated temperatures. Generally the resin and gum are reacted at temperatures between about 100 and about 150° C., for times of the order of ½ to 6 hours until a product of the desired tack and cohesive strength is achieved. After the gum and resin have been interreacted, the product can be dissolved in an aromatic solvent such as benzene, toluene or xylene to obtain a solution of from about 2,000 to 200,000 centipoises. Generally the solution contains a solids content of about 40 to about 70% by weight.

The solution can then be applied to the desired backing material by any suitable conventional means such as brushing, spraying, knife coating, and the like. The organic solvent is then evaporated and a film of the pressure-sensitive adhesive is formed on the backing material.

It has also be found that if small amounts of organopolysiloxane resin, as defined above, e.g., having the average unit formula:

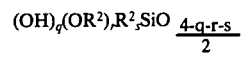

wherein q, $R^2$, s and r are as defined above, are admixed with the interreacted gum and resin adhesive material, improved properties, such as decreased tackiness, and increased peel and shear strength are realized. For this purpose from about 5 to 20, and preferably about 10 parts of organopolysiloxane resin per 100 parts of adhesive, are employed. Furthermore, an organopolysiloxane resin, within the above average unit formula, comprised of $SiO_2$ units and $(CH_3)_3SiO_{1/2}$ units is especially preferred for this purpose.

In addition, it may be desirable to include a peroxide free radical generating catalyst in the composition to render the pressure-sensitive adhesive thermosetting which in turn increases the adhesive properties at elevated temperatures. When a peroxide is present in the solution of the organopolysiloxane pressure-sensitive adhesive, the film is further heated after evaporation of the solvent, to temperatures of about 150 to about 250° C. Some suitable organic peroxide catalysts include benzoyl peroxide, and dicumyl peroxide.

The releaseable anti-stick layer of reactive terminal group containing dimethylpolysiloxane fluid coated on a sheet, e.g., a paper sheet or a material such as that suitable for the backings described above, and which has been cured can then be applied on top of the organopolysiloxane pressure-sensitive adhesive. The organopolysiloxane pressure-sensitive adhesive adheres in a releasable fashion to the coated anti-stick layer. The layer protects the surface of the organopolysiloxane from contamination and from adhering to undesired substrates until the layer is later removed. This can be done by carefully peeling or stripping without causing damage to the adhesive. The release film is removed from the pressure-sensitive adhesive without leaving residual amounts of film on the adhesive, and the article is then pressed against the surface to which final application is desired.

Alternatively, the articles of the present invention can be prepared by employing the technique known as transfer coating. More particularly, this involves applying the adhesive, as described and prepared above, to the reactive terminal group containing dimethylpolysiloxane fluid-coated side of the releasable anti-stick sheet. The adhesivecoated side of the resultant releasable anti-stick sheet is then laminated, pressed, or otherwise applied to the desired backing material, thereby producing the desired article. When ready for use, the releasable anti-stick layer, i.e., the reactive terminal group containing dimethylpolysiloxane fluid-coated sheet, is separated, leaving the adhesive-coated backing which can be applied to the desired substrate.

DESCRIPTION OF THE PREFERRED EMBODIMENTS

To further demonstrate the present invention, the following non-limiting examples are provided wherein amounts are by weight unless the contrary is stated.

EXAMPLE 1

Pressure-sensitive tapes according to this invention are prepared by coating a 3 mil poly(ethylene terephthalate) tape with a siloxane adhesive composition comprising:

A. 50 parts resin solids of a resin copolymer based on one mole $SiO_2$ reacted with 0.5 to 0.6 moles $(CH_3)_3SiO_{1/2}$;

B. 38 parts of a silanol-stopped polysiloxane copolymer gum consisting of 5.3 mole percent diphenylsiloxane and 94.7 mole percent dimethylsiloxane, such polymer having a viscosity in excess of 10,000,000 cps.; and C. 12 parts of a 0.2 mole percent methylvinylsiloxane, 5.3 mole percent diphenylsiloxane and 94.5 mole percent dimethylsiloxane, such copolymer gum having a viscosity over 10,000,000 cps.

Ingredients A, B and C are prepared as a solution in xylene at 55% solids content. An organic primary amine at 10 to 20 ppm on total solids content is used to catalyze the above mixture at reflux temperature (145°-155° C.) for a period of 1/2 to 6 hours. About one part of benzoyl peroxide per 100 parts of the silicone solids is added. The xylene solution is applied by knife-coating to the base. The coated article is then heated at about 90°-95° C for 2 minutes to evaporate the solvent and then heated for 5 minutes at 150°-175° C in a forced draft oven to cause reaction with the benzoyl peroxide. The pressure-sensitive adhesive coating has a thickness of about 1 mil.

A paper sheet which has been coated with a silanol-stopped dimethylpolysiloxane fluid (General Electric, SS-4191) containing a dibutyl-tin diacetate catalyst and a methylhydrogen polysiloxane cross linker is cured in a forced air oven for 20 to 30 seconds at 300° F and is laminated to the top of the coated tape using a 10-lb. roller. The peel strength between the adhesive and the strippable sheet is then tested by employing a two-jaw Scott tester. The separation of the release sheet is started by hand, then the adhesive and polyester base portion is fastened to one jaw and the release sheet to the other jaw. The upper jaw is fastened to a scale that reads in pounds and ounces and the lower jaw is attached to a mechanism that moves it away from the upper jaw at exactly 12 inches per minute. The peel strength of the adhesive to the release sheet is only 4 oz./in. It is thus seen that the strippable sheet is easily removed from the adhesive.

The pressure-sensitive adhesive coated article, after removal of the release sheet, is then tested for peel strength by application to a stainless steel panel and measured according to ASTM Standard D-1000. This test is similar to the above-described procedure with the steel panel in this case being attached to one of the jaws of the Scott tester. Even over a two-week period of oven aging, the values remain high and between 32 and 38 oz./in.

Moreover, after oven aging for two weeks at 140° F., the tapes protected with a strippable layer according to this invention are prepared for use by stripping with only a 4 oz./in. peel strength, using a pressure of 0.25 psi.

COMPARATIVE EXAMPLE 1

For comparative purposes, the procedure of Example 1 is repeated, but substituting an adhesive comprising a silanol-stopped dimethyl gum, instead of the alkylaryl gum-containing adhesive used therein. The peel strength after lamination with the release sheet was greater than 25 oz./in., and the paper consistently tore when attempts were made to strip it from the adhesive coated base.

EXAMPLE 2

The procedure of Example 1 is repeated, but substituting the following adhesive:

A. 50 parts resin solids of a resin copolymer based on one mole $SiO_2$ reacted with 0.5 to .6 moles $(CH_3)_3SiO_{1/2}$;

B. 40 parts of a silanol-stopped polysiloxane copolymer of 5.3 mole percent diphenylsiloxane and 94.7 mole percent dimethylsiloxane such polymer having a viscosity in excess of 10,000,000 cs.;

C. 10 parts of the following blend:
  i. 72 parts of a 0.2 mole percent methyl vinyl siloxane, 5.3 mole percent diphenylsiloxane, and 94.5 mole percent dimethylsiloxane such polymer having an initial viscosity of over 10,000,000 cs.,
  ii. 18 parts of a fumed silica having a surface area of over 250 m²/g,
  iii. 8.5 parts a process aid composed of 30 mole percent diphenylsiloxane and 70 percent dimethylsiloxane having a viscosity of 30 to 60 cs.,
  vi. 2.5 parts of octamethyl cycloterasiloxane.

The above ingredients A, B and C are prepared in a solution of xylene at 60% overall solids content. An alkali catalyst such as NaOH is used at normally 10 to 25 ppm on total solution weight at reflux temperatures 145° to 155° C. to effect a copolymer of the resin and gums for a cook time of ½ to 6 hours. A tape is obtained from which the release sheet is easily removed, without tearing.

It is apparent from the examples that the present invention provides a means whereby orgaopolysiloxane pressure-sensitive adhesives can be protected from contamination and from premature sticking. Moreover, the protective layer can be easily removed when it is desired to use the adhesive coated base material. It is also apparent from the data in Comparative Example 1 that the use of an adhesive which is outside the scope of the present invention because it does not contain an alkylaryl polysiloxane gum component, will not provide a useful strippable tape.

EXAMPLE 3

Pressure-sensitive tapes according to this invention are prepared by coating a 3 mil poly)ethylene terephthalate) tape with a siloxane adhesive composition comprising:

A. 50 parts resin solids of a resin copolymer based on one mole $SiO_2$ reacted with 0.5 to 0.6 moles $(CH_3)_3SiO_{1/2}$;

B. 38 parts of a silanol-stopped polysiloxane copolymer gum consisting of 13 mole percent diphenylsiloxane and 87 mole percent dimethylsiloxane, such polymer having a viscosity in excess of 10,000,000 cps.; and C. 12 parts of a 0.2 mole percent methylvinyl siloxane, 5.3 mole percent diphenylsiloxane and 94.5 mole percent dimethylsiloxane, such copolymer gum having a viscosity over 10,000,000 cps.

Ingredients A, B and C are prepared as a solution in xylene at 55% solids content. An organic primary amine at 10 to 20 ppm of total solids content is used to catalyze the above mixture at reflux temperature (145°-155° C) for a period of ½ to 6 hours. About 10 additional parts of component A above, i.e., a resin copolymer based on one mole SiO$_2$ reacted with 0.5 to 0.6 moles (CH$_3$)$_3$SiO$_{1/2}$ are then added to the resultant reaction product. About one part of benzoyl peroxide per 100 parts of the silicone solids is then added. The xylene solution is applied by knife-coating to the base. The coated article is the heated at about 90°–95° C for 2 minutes to evaporate the solvent and then heated for 5 minutes at 150°–175° C in a forced draft oven to cause reaction with benzoyl peroxide. The pressure-sensitive adhesive coating has a thickness of about 1 mil.

A paper sheet which has been coated with a silanol-stopped dimethylpolysiloxane fluid (General Electric, SS-4191) and cured in the same manner as in Example 1 is laminated t the top of the coated tape using a 10-lb roller. The peel strength between the adhesive and the strippable sheet is then tested by employing a two-jaw Scott tester. The separation of the release sheet is started by hand then the adhesive and polyester base portion is fastened to one jaw and the release sheet to the other jaw. The upper jaw is fastened to a scale that reads in pounds and ounces and the lower jaw is attached to a mechanism that moves it away from the upper jaw at exactly 12 inches per minute. The peel strength of the adhesive to the release sheet is only about 1 oz./in. It is thus seen that the strippable sheet is easily removed from the adhesive.

The pressure-sensitive adhesive coated material, after removal of the release sheet, is then tested for peel strength by application to a stainless steel panel and measured according to ASTM Standard D-1000. This test is similar to the above-described procedure with the steel panel in this case being attached to one of the jaws of the Scott tester. Even over a two-week period of oven aging, the values remain high and between 35 and 41 oz./in.

Moreover, after oven aging for two weeks at 140° F., the tapes protected with a strippable layer according to this invention are prepared for use by stripping with only a 1 oz./in. peel strength, using a pressure of 0.25 psi.

EXAMPLE 4

Pressure-sensitive tapes according to this invention are prepared by transfer coating a 3 mil polyethylene tape with a siloxane adhesive composition comprising:

A. 50 parts resin solids of a resin copolymer based on one mole SiO$_2$ reacted with 0.5 to 0.6 moles (CH$_3$)$_3$SiO$_{1/2}$;

B. 38 parts of a silanol-stopped polysiloxane copolymer gum consisting of 13 mole percent diphenylsiloxane and 87 mole percent dimethylsiloxane such polymer having a viscosity in excess of 10,000,000 cps.; and C. 12 parts of a 0.2 mole percent methylvinylsiloxane, 5.3 mole percent diphenylsiloxane and 94.5 mole percent dimethylsiloxane, such copolymer gum having a viscosity over 10,000,000 cps.

Ingredients A, B and C are prepared as a solution in xylene at 55% solids content. An organic primary amine at 10 to 20 ppm of total solids content is used to catalyze the above mixture at reflux temperatue (145°–155° C) for a period of 1/2 to 6 hours. About 10 additional parts of component A above, i.e., a resin copolymer based on one mole SiO$_2$ reacted with 0.5 to 0.6 moles (CH$_3$)$_3$SiO$_{1/2}$ are then added to the resultant reaction product. About one part of benzoyl peroxide per 100 parts of the silicone solids is then added.

The silanol-stopped dimethylpolysiloxane fluidcoated side of the release sheet, as prepared in Example 3, is then coated with the above-prepared xylene solution. The resultant release sheet is then heated at about 90°–95° for 2 minutes to evaporate the solvent, and then heated for 5 minutes at 150°–175° C in a forced draft oven to cause reaction with benzoyl peroxide. The resultant adhesive-coated release sheet is then pressed onto a polyethylene backing. The release sheet is readily peeled away from the backing, leaving about a 1 mil thickness of adhesive coating having excellent peel strength properties.

EXAMPLE 5

Pressure-sensitive tapes according to this invention are prepared by coating a 3 mil poly(ethylene terephthalate) tape with a siloxane adhesive composition comprising:

A. 60 parts resin solids of a resin copolymer based on one mole SiO$_2$ reacted with 0.5 to 0.6 moles (CH$_3$)$_3$SiO$_{1/2}$;

B. 38 parts of a silanol-stopped polysiloxane copolymer gum consisting of 13 mole percent diphenylsiloxane and 87 mole percent dimethylsiloxane, such polymer having a viscosity in excess of 10,000,000 cps.; and C. 12 parts of a 0.2 mole percent methylvinylsiloxane, 5.3 mole percent diphenylsiloxane and 94.5 mole percent dimethylsiloxane, such copolymer gum having a viscosity over 10,000,000 cps.

Ingredients A, B and C are prepared as a solution in xylene at 55% solids content. An organic primary amine at 10 to 20nppm on total solids content is used to catalyze the above mixture at reflux temperature (145°–155° C.) for a period of 1/2 to 6 hours. About one part of benzoyl peroxide per 100 parts of the silicone solids is added. The xylene solution is applied by knife-coating to the base. The coated article is then heated at about 140° C. for 10 minutes to evaporate the solvent and then heated for 2 minutes at 175° C. in a forced draft oven to cause reaction with the benzoyl peroxide. The pressure-sensitive adhesive coating has a thickness of about 1 mil.

A paper sheet which has been coated with a silanol-stopped dimethylpolysiloxane fluid (General Electric SS-4191) and cured as in Example 1, is laminated to the top of the coated tape using a 10-lb roller. The peel strength between the adhesive and the strippable sheet is then tested by employing a two-jaw Scott tester. The separation of the release sheet is started by hand then the adhesive and polyester base portion is fastned to one jaw and the release sheet to the other jaw. The upper jaw is fastened to a scale that reads in pounds and ounces and the lower jaw is attached to a mechanism that moves it away from the upper jaw at exactly 12 inches per minute. The peel strength of the adhesive to the release sheet is only about 1 oz./in. It is thus seen that the strippable sheet is easily removed from the adhesive.

The pressure-sensitive adhesive coated article, after removal of the release sheet, is then tested for peel strength by application to a stainlss steel panel and measured according to ASTM Standard D-1000. This test is similar to the above-described procedure with the steel panel in this case being attached to one of the jaws of the Scott tester. Even over a two-week period of oven aging, the values remain high and between 35 and 41 oz./in.

Moreover, after oven aging for two weeks at 140° F., the tapes protected with a strippable layer according to this invention and prepared for use by stripping with only a 1 oz./in. peel strength, using a pressure of 0.25 psi.

EXAMPLE 6

Pressure-sensitive tapes according to this invention are prepared by coating a 3 mil poly(ethylene terephthalate) tape with a siloxane adhesive composition comprising:

A. 60 parts resin solids of a resin copolymer based on one mole $SiO_2$ reacted with 0.5 to 0.6 moles $(CH_3)_3SiO_{1/2}$;

B. 38 parts of a silanol-stopped polysiloxane copolymer gum consisting of 13 mole percent diphenylsiloxane and 87 mole percent dimethylsiloxane, such polymer having a viscosity in excess of 10,000,000 ps.; and C. 12 parts of 0.2 mole percent methylvinylsiloxane, 5.3 mole percent diphenylsiloxane and 94.5 mole percent dimethylsiloxane, such copolymer gum having a viscosity over 10,000,000 cps.

Ingredients A, B and C are prepared as a solution in xylene at 55% solids content. An organic primary amine at 10 to 20 ppm on total solids content is used to catalyze the above mixture at reflux temperature (145°-155° C.) for a period of ½ to 6 hours. About one part of benzoyl peroxide per 100 parts of the silicone solids is added. The xylene solution is applied by knife-coating to the base. The coated article is then heated at about 140° C. for 10 minutes to evaporate the solvent and then heated for 2 minutes at 175° C. in a forced draft oven to cause reaction with the benzoyl peroxide. The pressure-sensitive adhesive coating has a thickness of about 1 mil.

A paper sheet which has been coated with a dimethylvinyl-stopped dimethylpolysiloxane fluid (General Electric, SS-4280) containin a platinum catalyst and a methylhydrogen polysiloxane cross-linker is cured in a forced air oven for 20-30 seconds at 300° F and is laminated to the top of the coated tape using a 10-lb. roller. The peel strength between the adhesive and the strippable sheet is then tested by employing a two-jaw Scott tester. The separation of the release sheet is started by hand then the adhesive and polyester base portion is fastened to one jaw and the release sheet to the other jaw. The upper jaw is fastened to a scale that reads in pounds and ounces and the lower jaw is attached to a mechanism that moves it away from the upper jaw at exactly 12 inches per minute. The peel strength of the adhesive to the release sheet is only about 1 oz./in. It is thus seen that the strippable sheet is easily removed from the adhesive.

The pressure-sensitive adhesive coating article, after removal of the release sheet, is then tested for peel strength by application to a stainless steel panel and measured according to ASTM Standard D-1000. This test is similar to the above-described procedure with the steel panel in this case being attached to one of the jaws of the Scott tester. Even over a two-week period of oven aging, the values remain high and between 35 and 41 oz./in.

Moreover, after oven aging for two weeks at 140° F., the tapes protected with a strippable layer according to this invention and prepared for use by stripping with only a 1 oz./in. peel strength, using a pressure of 0.25 psi.

EXAMPLE 7

Pressure-sensitive tapes according to this invention are prepared by coating a 3 mil poly(ethylene terephthalate) tape with a siloxane adhesive composition comprising:

A. 60 parts resin solids of a resin copolymer based on one mole $SiO_2$ reacted with 0.5 to 0.6 moles $(CH_3)_3SiO_{1/2}$;

B. 38 parts of a silanol-stopped polysiloxane copolymer gum consisting of 13 mole percent diphenylsiloxane and 87 mole percent dimethylsiloxane, such polymer having a viscosity in excess of 10,000,000 cps.; and C. 12 parts of a 0.2 mole percent methylvinylsiloxane, 5.3 mole percent diphenylsiloxane and 94.5 mole percent dimethylsiloxane, such copolymer gum having a viscosity over 10,000,000 cps.

Ingredients A, B and C are prepared as a solution in xylene at 55% solids content. An organic primary amine at 10 to 20 ppm on total solids content is used to catalyze the above mixture at reflux temperature (145°-155 C.) for a period of 1/2 to 6 hours. About one part of benzoyl peroxide per 100 parts of the silicone solids is added. The xylene solution is applied by knife-coating to the base. The coated article is then heated at about 140° C. for 10 minutes to evaporate the solvent and then heated for 2 minutes at 175° C. in a forced draft oven to cause reaction with the benzoyl peroxide. The pressure-sensitive adhesive coating has a thickness of about 1 mil.

A paper sheet which has been coated with a dimethylhydrogen stopped dimethylpolysiloxane fluid having a viscosity of about 300 cps. at 25° C and containing a platinum catalyst and a methylvinylpolysiloxane cross-linker is cured and is laminated to the top of the coated tape using a 10-lb. roller. The peel strength between the adhesive and the strippable sheet is then tested by employing a two-jaw Scott tester. The separation of the release sheet is started by hand then the adhesive and polyester base portion is fastened to one jaw and the release sheet to the other jaw. The upper jaw is fastened to a scale that reads in pounds and ounces and the lower jaw is attached to a mechanism that moves it away from the upper jaw at exactly 12 inches per minute. The peel strength of the adhesive to the release sheet is only about 1 oz./in. It is thus seen that the strippable sheet is easily removed from the adhesive.

The pressure-sensitive adhesive coated article, after removal of the release sheet, is then tested for peel strength by application to a stainless steel panel and measured according to ASTM Standard D-1000. This test is similar to the above-described procedure with the steel panel in this case being attached to one of the jaws of the Scott tester. Even over a two-week period of oven aging, the values remain high and between 35 and 41 oz./in.

Moreover, after oven aging for two weeks at 140° F., the tapes protected with a strippable layer according to this invention and prepared for use by stripping with only a 1 oz./in. peel strength, using a pressure of 0.25 psi.

Obviously, many variations are possible in light of the above detailed description. For example, the adhesive can contain one gum component or a blend of two or more gums. One or both of the gums may also incorporate vinylsilicon linkages, and the gum can have a vinyl chain-stopper as well. The amount of residual silanol can be varied, although it is preferable that the material contain much less residual silanol than the gum used in Comparative Example 1. The amount of aryl bonded-silicon groups in the copolymer gum can also be varied. For example, with 13 mole % of phenyl groups in a 1.1

I claim:

1. An article comprising a unitary coherent backing, an organopolysiloxane pressure-sensitive adhesive layer on at least one side of said backing, and a releasable anti-stick layer comprising a cured reactive terminal group containing dimethylpolysiloxane fluid-coated sheet on the organopolysiloxane pressure-sensitive adhesive, said adhesive comprising the intercondensation product of a mixture containing an organopolysiloxane resin and at least one alkylaryl polysiloxane gum.

2. An article as defined in claim 1 wherein said alkylaryl polysiloxane gum has a viscosity from about 200,000 to about 15,000,000 centipoises at 25° C. and which contains an average from about 1.85 to 2.01 silicon-bonded alkyl and aryl radicals per silicon atom, with the alkyl and aryl radicals being selected from the group consisting of alkyl radicals having from 1 to 8 carbon atoms; cycloalkyl radicals having from 5 to 7 carbon atoms in the ring; lower alkenyl radicals having from 2 to 8 carbon atoms, mononuclear aryl radicals, mononuclear aryl lower alkyl radicals having from 1 to 6 carbon atoms in the alkyl group and halogenated derivatives of the above radicals, the organic radicals being attached to silicon through silicon-carbon linkages and with there being present in the gum from about 2% to about 75% aryl-silicon linkages of the total silicon organic linkages and about 0.001 to 0.25% by weight silicon-bonded hydroxyl groups or alkoxy groups.

3. An article as defined in claim 1 wherein said reactive terminal group containing dimethylpolysiloxane fluid is selected from the group consisting of a silanol-stopped dimethylpolysiloxane fluid, a dimethylvinyl-stopped dimethylpolysiloxane fluid and a dimethylhydrogen stopped dimethylpolysiloxane fluid.

4. An article as defined in claim 1 wherein said reactive terminal group containing dimethylpolysiloxane fluid is a silanol-stopped dimethylpolysiloxane.

5. An article as defined in claim 2 wherein said reactive terminal group containing dimethylpolysiloxane fluid is selected from the group consisting of a silanol-stopped dimethylpolysiloxane fluid, a dimethylvinyl stopped dimethylpolysiloxane fluid and a dimethylhydrogen-stopped dimethylpolysiloxane fluid.

6. An article as defined in claim 4 wherein said silanol-stopped, dimethylpolysiloxane fluid has a viscosity of from 1,000 to 10,000,000 centipoise.

7. An article as defined in claim 6 wherein said fluid at 25° C corresponds to the formula

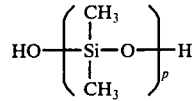

wherein p is a whole number that varies from about 300 to about 5260.

8. An article as defined in claim 1 wherein the thickness of the organopolysiloxane pressure-sensitive adhesive layer is from about 0.7 to about 5 mils.

9. An article as defined in claim 1 wherein said coated sheet is comprised of paper.

10. An article as defined in claim 1 wherein the thickness of said coated sheet is from about 0.02 to about 3 mils.

11. A process for adherently applying an article coated with an organopolysiloxane pressure-sensitive adhesive to a substrate, said process comprising:
a. providing an article comprising a backing, an organopolysiloxane pressure-sensitive adhesive layer on at least one side of said backing, and a releasable anti-stick layer comprising a cured reactive terminal group containing dimethylpolysiloxane fluid-coated sheet on the organopolysiloxane pressure-sensitive adhesive, said adhesive comprising the intercondensation product of a mixture containing an organopolysiloxane resin and at least one alkylarylpolysiloxane gum;
b. separating said releasable anti-stick layer from the organopolysiloxane pressure-sensitive adhesive; and
c. applying the article containing the organopolysiloxane pressure-sensitive adhesive to a substrate.

12. A process as defined in claim 11 wherein said reactive terminal group containing dimethylpolysiloxane is selected from the group consisting of a silanol-stopped dimethylpolysiloxane, a dimethylvinyl-stopped dimethylpolysiloxane and a dimethylhydrogen-stopped dimethylpolysiloxane.

13. An article as defined in claim 1 wherein said organopolysiloxane resin comprises a cohydrolysis product of a trialkyl hydrolyzable silane and an alkyl silicate.

14. An article as defined in claim 13 there being employed in said resin from 1 to 2 moles of the alkyl silicate per mole of trialkyl hydrolyzable silane.

15. An article as defined in claim 1 wherein said organopolysiloxane resin comprises a copolymer of $SiO_2$ units and $(CH_3)_3SiO_{1/2}$ units.

16. An article as defined in claim 15 there being employed in said resin one mole of $SiO_2$ per 0.5 to 0.6 moles of $(CH_3)_3SiO_{1/2}$.

17. An article as defined in claim 15 wherein said mixture of said organopolysiloxane resin and said alkylarylpolysiloxane gum is comprised of from 1 to 1.5 parts by weight of said organopolysiloxane resin per 1 part by weight of said alkylarylpolysiloxane gum.

18. An article as defined in claim 16 wherein said mixture of said organopolysiloxane resin and said alkylarylpolysiloxane gum is comprised of from 1 to 1.5 parts by weight of said organopolysiloxane resin per 1 part of said alkylarylpolysiloxane gum.

19. An article comprising a unitary coherent backing, an organopolysiloxane pressure-sensitive adhesive layer on at least one side of said backing, and a releasable anti-stick layer comprising a cured reactive terminal group containing dimethylpolysiloxane fluid-coated sheet on the organopolysiloxane pressure-sensitive adhesive, said adhesive comprising the intercondensation product of a mixture containing an organopolysiloxane resin, a silanol-stopped polysiloxane copolymer gum having a viscosity from about 200,000 to about 15,000,000 at 25° C comprising diphenylsiloxane and dimethylsiloxane, and a polysiloxane copolymer gum having a viscosity from about 200,000 to about 15,000,000 at 25° C comprising methylvinylsiloxane, diphenylsiloxane and dimethylsiloxane.

20. An article as defined in claim 19 wherein said organopolysiloxane resin comprises a copolymer of $SiO_2$ units and $(CH_3)_3SiO_{1/2}$ units.

21. An article as defined in claim 20, there being employed in said organopolysiloxane resin one mole of $SiO_2$ per 0.5 to 0.6 moles of $(CH_3)_3SiO_{1/2}$.

22. An article as defined in claim 20 wherein said reactive terminal group containing dimethylpolysiloxane fluid is selected from the group consisting of a silanol-stopped dimethylpolysiloxane, a dimethylvinyl-stopped dimethylpolysiloxane and a dimethylhydrogen-stopped dimethylpolysiloxane.

23. An article as defined in claim 21 wherein said reactive terminal group containing dimethylpolysiloxane fluid is selected from the group consisting of a silanol-stopped dimethylpolysiloxane, a dimethylvinyl-stopped dimethylpolysiloxane and a dimethylhydrogen-stopped dimethylpolysiloxane.

24. An article as defined in claim 20 wherein said mixture of said organopolysiloxane resin, said silanol-stopped polysiloxane copolymer gum and said polysiloxane copolymer gum is comprised of from about 1 to 1.5 parts by weight of said organopolysiloxane resin per 1 part by weight of the total copolymer gum content.

25. An article as defined in claim 21 wherein said mixture of said organopolysiloxane resin, said silanol-stopped polysiloxane copolymer gum and said polysiloxane copolymer gum is comprised of 1 to 1.5 parts by weight of said organopolysiloxane resin per 1 part by weight of the total copolymer gum content.

26. A process for adherently applying an article with an organopolysiloxane pressure-sensitive adhesive to a substrate, said process comprising:
 a. providing an orticle comprising a backing, an organopolysiloxane pressure-sensitive adhesive layer on at least one side of said backing, and a releasable anti-stick layer comprising a cured reactive terminal group containing dimethylpolysiloxane fluid-coated sheet on the organopolysiloxane pressure-sensitive adhesive, said adhesive comprising the intercondensation product of a mixture containing an organopolysiloxane resin comprised of $SiO_2$ units and $(CH_3)_3SiO_{1/2}$ units, a silanol-stopped polysiloxane copolymer gum having a viscosity from about 200,000 to about 15,000,000 at 25° C comprising diphenylsiloxane and dimethylsiloxane, and a polysiloxane copolymer gum having a viscosity from about 200,000 to about 15,000,000 at 25° C comprising methylvinylsiloxane, diphenylsiloxane and dimethylsiloxane;
 b. separating said releasable anti-stick layer from the organopolysiloxane pressure-sensitive adhesive; and
 c. applying the article containing the organopolysiloxane pressure-sensitive adhesive to a substrate.

27. A process as defined in claim 25 wherein said reactive terminal group containing dimethylpolysiloxane fluid is selected from the group consisting of a silanol-stopped dimethylpolysiloxane, a dimethylvinyl-stopped dimethylpolysiloxane and a dimethylhydrogen-stopped dimethylpolysiloxane.

* * * * *